United States Patent
Matsuo et al.

[11] Patent Number: 6,070,939
[45] Date of Patent: Jun. 6, 2000

[54] VEHICLE SEAT

[75] Inventors: Takashi Matsuo; Harumi Matsuo, both of Hamamatsu, Japan

[73] Assignee: Suzuki Motor Corporation, Hamamatsu, Japan

[21] Appl. No.: 09/165,870

[22] Filed: Oct. 2, 1998

[30] Foreign Application Priority Data

Oct. 3, 1997 [JP] Japan ................................. 9-270730

[51] Int. Cl.[7] ...................................................... B60N 2/02
[52] U.S. Cl. ..................... 297/378.12; 297/335; 297/336; 297/452.55; 296/68.1
[58] Field of Search ......................... 297/378.12, 378.14, 297/335, 336, 452.55; 296/68.1

[56] References Cited

U.S. PATENT DOCUMENTS

| | | | |
|---|---|---|---|
| 4,124,250 | 11/1978 | Weinich | 297/335 |
| 4,871,209 | 10/1989 | Handelman | 297/452.55 X |
| 5,044,683 | 9/1991 | Parsson | 297/378.12 X |
| 5,133,589 | 7/1992 | Kimura | 297/335 |
| 5,522,645 | 6/1996 | Dahlbacka | 297/452.55 |
| 5,658,046 | 8/1997 | Rus | 297/378.12 X |
| 5,662,368 | 9/1997 | Ito et al. | 297/366 X |
| 5,700,055 | 12/1997 | Davidson et al. | 297/378.12 |
| 5,707,103 | 1/1998 | Balk | 297/378.12 X |
| 5,738,411 | 4/1998 | Sutton et al. | 297/378.12 |
| 5,795,023 | 8/1998 | Kayumi | 297/336 X |

*Primary Examiner*—Peter M. Cuomo
*Assistant Examiner*—Rodney B. White
*Attorney, Agent, or Firm*—Alston & Bird LLP

[57] ABSTRACT

The disclosure describes a double folding type of seat, wherein a panel for at least a seat cushion is molded in a synthetic resin material, and at the same time, hinge male parts of the hinge mechanisms are formed integrally into the molded cushion, and thus decreases the number of parts, reduces the weight, and improves the assembling performance. In particular, the seat includes a reinforcement panel 4 for a seat cushion 2 or seat back 3 being molded in a synthetic resin material, and additional parts for the reinforcement panel being integrally formed.

9 Claims, 8 Drawing Sheets

VEHICLE SEAT

BACKGROUND OF THE INVENTION

1. Field of the Invention

The present invention relates to a vehicle seat, wherein a reinforcement panel for use with a seat cushion or the like is molded in a synthetic resin, and additional parts associated with the said reinforcement panel are formed integrally into the said reinforcement panel.

2. Description of the Related Art

For use in a vehicle such as an automobile, the so-called double folding type of seats are known, which are constructed in such a manner that a rear seat may be folded down, when not in use, towards the front seat in order to allow the rear space to be utilized to expand the loading space of the vehicle.

Such a vehicle seat has a seat cushion which can be erected about its forward end so as to allow the seat back to be folded down and housed in the rear of the erected seat cushion, and various parts are mounted to the seat cushion, as illustrated in FIGS. 9 through 11.

FIG. 9 shows the hinge mechanism provided between the seat cushion and the floor to allow the seat cushion 100 to swing and erect.

This hinge mechanism consists of a hinge male part 103 secured with a bolt 102 to a weld nut 101 mounted inside the seat cushion 100, and a hinge female part 105 fastened to the floor side and connected by way of a pin 104 to the hinge male part 103.

FIG. 10 shows a locking device 106 for securing the seat cushion 100 to the striker (not shown) on the floor side.

This locking device 106 consists of a base 109 secured with a bolt 108 to a weld nut 107 mounted inside the seat cushion 100, a locking body 111 supported by way of a pin 110 to the base 109, and a coil spring 112 which is mounted on the said pin 110 and urged in such a direction that the locking body 111 is engaged with the striker.

FIG. 11 shows a hook 113 having a belt, which is used to fasten the seat cushion 100 to the seat back, when the seat cushion 100 is erected and the seat back is forwardly folded down and housed in the rear of the seat cushion 100.

The hook 113 having the belt is provided at the base end thereof with a resin plate 116, which is secured with a screw 115 to a weld nut 114 mounted inside the seat cushion 100.

In the prior art, however, every one of the weld nuts 101, 107, 114 has to be welded to a metallic cushion panel 117.

In addition, the bolts 102 and 108 and the screw 115 are required respectively with reference to FIGS. 9, 10, and 11. Furthermore, with respect to FIG. 11, because no part is provided to enclose the hook 113 having the belt, and because the hook 113 having the belt is exposed between the seat cushion 100 and the floor, unfavorable appearance ensues when the seat cushion is placed in the position for a passenger to take a seat.

SUMMARY OF THE INVENTION

An object of the present invention is to resolve the above-mentioned problems, by molding the reinforcement panel for use with the seat cushion or the like in a synthetic resin, and molding additional parts associated with the reinforcement panel in such a manner as to be integrated into the said panel, and thus to provide a vehicle seat which allows the decreased number of parts, reduced weight, and improved assembling performance.

In order to resolve the above-mentioned problems, the present invention is directed to mold the reinforcement panel, in a synthetic resin, for use with the seat cushion and/or seat back in the double folding type vehicle seat, and integrally mold the additional parts associated with the said reinforcement panel.

Moreover, the present invention is directed to provide the double folding type vehicle seat which is constructed in such a way that the seat cushion is fixed to the support structure therefor turnably about its forward end so that the seat cushion may be erected, wherein the cushion panel for the said seat cushion is molded in a synthetic resin, and the hinge male part of the hinge for supporting the said cushion panel turnably with respect to the support structure is molded integrally into the said cushion panel.

Further, the present invention is directed to provide the double folding type vehicle seat which is constructed in such a way that the seat cushion is fixed to the support structure therefor turnably about its forward end so that the seat cushion may be erected, wherein the cushion panel for the said seat cushion is molded in a synthetic resin, a recess is formed on the bottom surface of the said cushion panel at the backward end, and a locking means is provided in the said recess for securing the said seat cushion to the support structure.

Moreover, the present invention is directed to provide the double folding type vehicle seat, which is constructed in such a way that the seat cushion is fixed to the support structure therefor turnably about its forward end so that the seat cushion may be erected, the seat back is folded down to be housed in the rear of the seat cushion when erected, and the hook with belt fixed to the seat cushion is engaged with the locking part provided on the seat back, wherein the cushion panel for the said seat cushion is molded in a synthetic resin, and a recess for supporting the hook having a belt and a housing for receiving the hook when not in use are formed on the bottom surface of the said cushion panel.

The present invention allows the number of parts to be decreased, the weight to be reduced, and the assembling to be improved by molding the panel for use with the seat cushion or the like in the double folding type seat, and integrally forming the hinge male part of the hinge or the like, in molding the said panel.

As previously mentioned, the vehicle seat according to the present invention has the operational effects as described below.

In the double folding type seat in accordance with the present invention, the reinforcement panel for use with the seat cushion or seat back is molded in a synthetic resin, and the additional parts for the reinforcement panel are integrally formed with the reinforcement panel, as a result of which the number of components can be decreased, and the weight can be reduced. In addition, the assembling becomes easier, and accordingly, disassembling work will be easier for recycling.

In the double folding type vehicle seat which is constructed in such a manner that the seat cushion is secured to the support structure turnably about the forward end of the cushion so that the seat cushion may be erected, the cushion panel for the aforementioned seat cushion is molded in a synthetic resin material, while the hinge male part of the hinge is formed integrally to the said cushion panel, for turnably supporting the cushion panel to the support structure, as a result of which it is no longer necessary to use the bolts and weld nuts, which must have been used in the prior art. In addition, the assembling process is improved, and accordingly, disassembling work will be easier for recycling.

In the double folding type vehicle seat which is constructed in such a manner that the seat cushion is secured to the support structure turnably about the forward end of the cushion so that the seat cushion may be erected, the cushion panel for the aforementioned seat cushion is molded in a synthetic resin material, while a recess is formed on the bottom surface at the rear end of the cushion panel, and a locking means is mounted in the recess for securing the abovementioned seat cushion to the support structure, so that the locking body can directly be held by means of a pin. As a result, it is no longer necessary to use the base, bolts, and weld nuts, which have been used traditionally. In addition, the assembling performance is improved, and accordingly, disassembling work will be easier for recycling.

In the double folding type vehicle seat which is constructed in such a manner that the seat cushion is secured to the support structure turnably about the forward end of the cushion so that the seat cushion may be erected, that the seat back is folded down and housed in the rear of the seat cushion when erected, and that the hook having a belt attached secured to the seat cushion is engaged with the locking part provided on the seat back so as to fix the seat cushion, the cushion panel for the aforementioned seat cushion is molded in a synthetic resin material, while on the bottom surface of the seat cushion a recess for supporting the hook with belt is formed as well as a housing for accommodating the hook while not in use. By integrally forming the housing and the recess for supporting the hook, the hook can directly be held by means of a pin, so that it is no longer necessary to use the resin plate, screws, and weld nuts, which have been used traditionally. In addition, the hook can be accommodate in the housing, so that the hook will no longer rattle. Furthermore, the assembling performance is improved, and accordingly, disassembling work will be easier for recycling.

DETAILED DESCRIPTION OF PREFERRED EMBODIMENTS

An exemplified embodiment of the present invention will be described in detail below with reference to the drawings.

Figure 1:
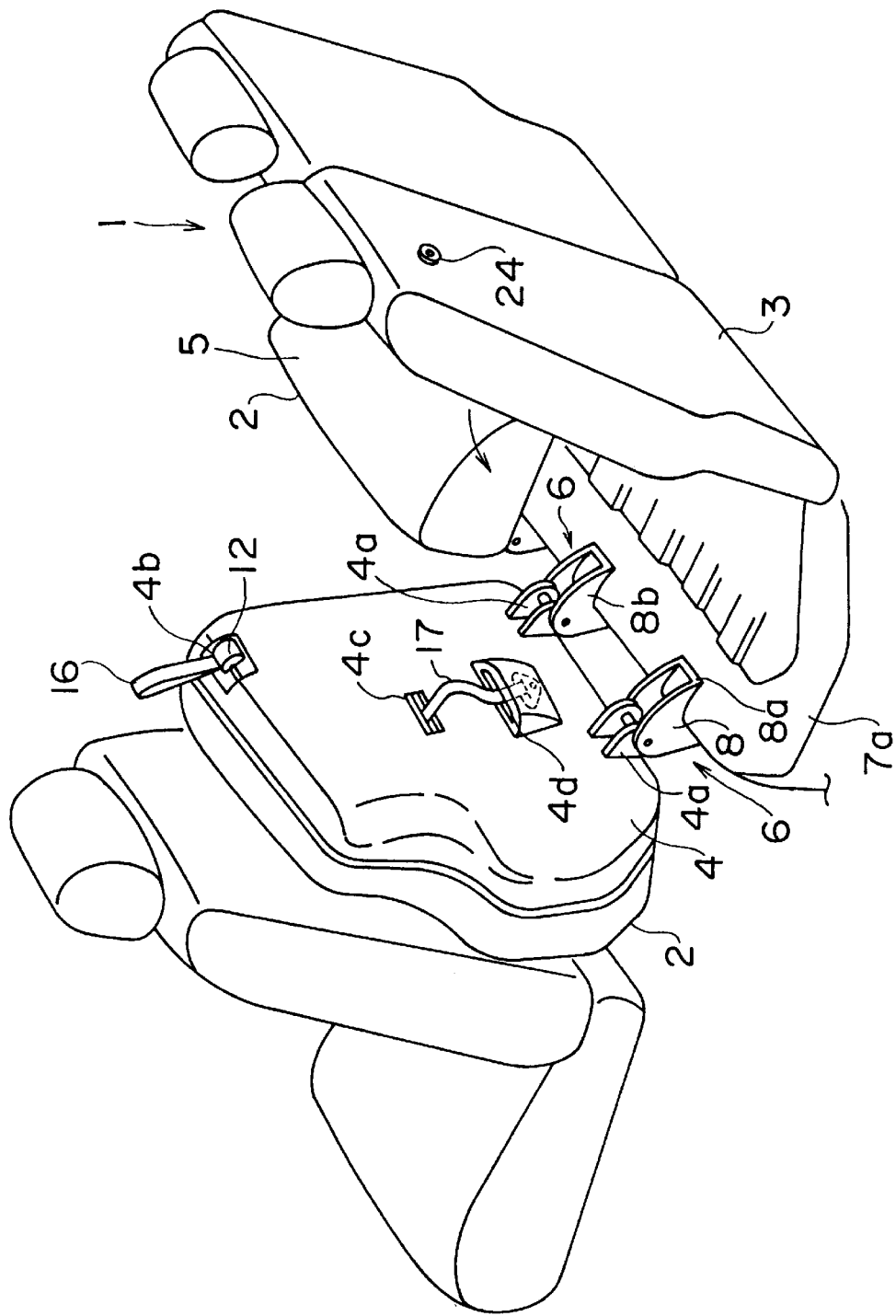
FIG. 1 is a perspective view showing an embodiment of the double folding type of rear seat according to the present invention.

Referring to FIG. 1, there is shown the double folding type rear seat 1 according to the present invention. This rear seat 1 comprises the seat cushion 2 which can be erected longitudinally in the forward direction, and the seat back 3 which can be folded down in the forward direction.

The seat cushion 2 has the cushion panel 4 formed of a synthetic resin material as the reinforcement panel so as to define the bottom surface of the seat, and the cushion body 5 which defines the top surface of the seat. Alternatively, the whole body of the seat cushion 2 may entirely be formed of the synthetic resin material.

The seat cushion 2 is turnably secured to the floor panel 7 in the rear portion of the vehicle by way of the hinge mechanisms 6 which are mounted on the bottom surface of the cushion at the right and left positions on the forward end, and is disposed so that it can be erected about the hinge mechanisms 6 longitudinally in the forward direction.

Figure 2:
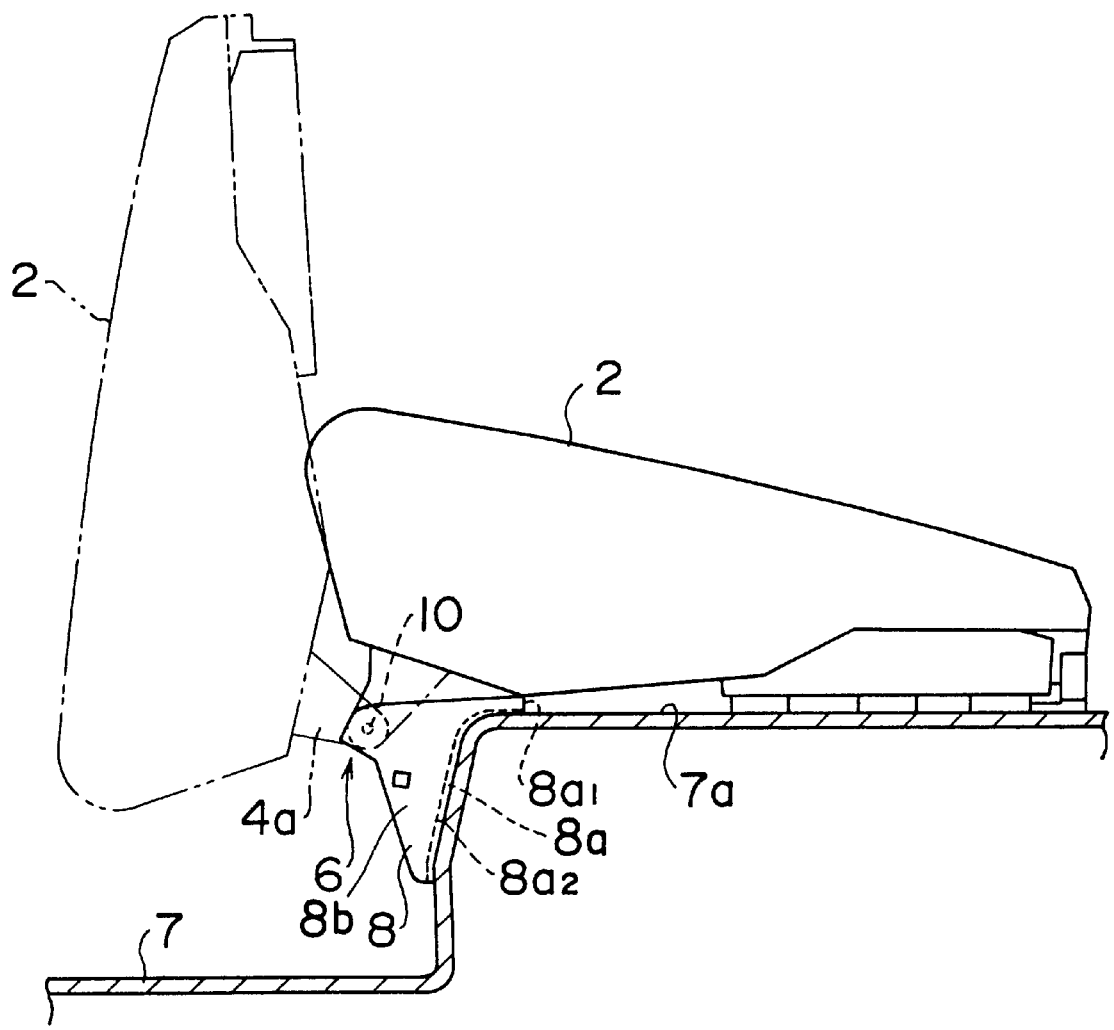
FIG. 2 is a side view showing the movement of the seat cushion of FIG. 1.
Figure 3:
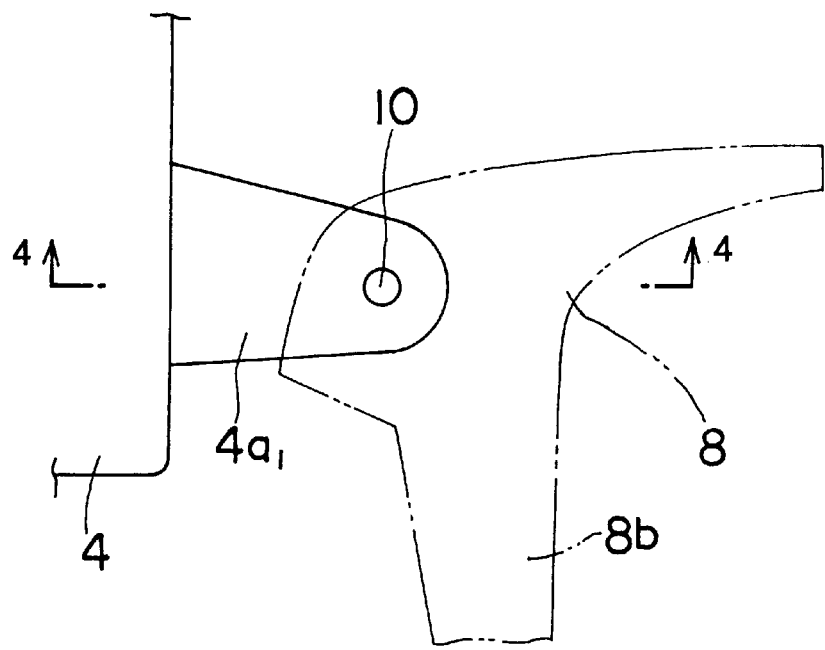
FIG. 3 is a conceptual view showing the hinge mechanism of FIG. 2.
Figure 4:
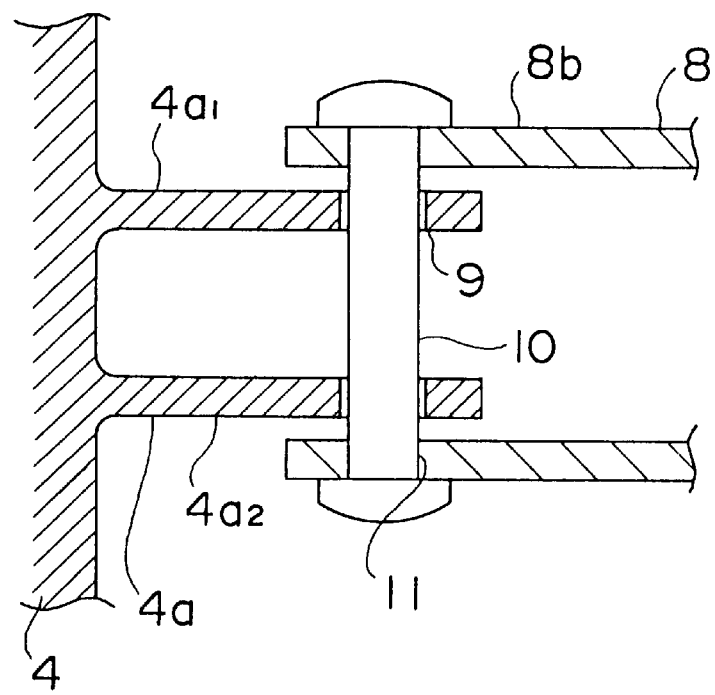
FIG. 4 is a section view taken along the line A—A of FIG. 3.

As illustrated in FIGS. 2 to 4, each of the aforementioned hinge mechanisms 6 comprises the hinge male part 4a which is integrally formed into the cushion panel 4, and the hinge female part 8 which is screwed to the front surface of the staged part 7a constructed by raising a part of the floor panel 7.

The hinge male part 4a comprises a pair of tongue pieces 4$a_1$ and 4$a_2$ which is constructed to extend downwardly out of the cushion panel 4 on the forward end of the bottom surface at each of the right and left positions, and supported rotatably on the axis by the hinge female part 8 by means of the pin 10 inserted through the pin holes 9 formed on the tongue pieces 4$a_1$ and 4$a_2$.

On the other hand, the hinge female part 8 is composed of a pair of flange parts 8b, which is formed by bending the reverse L-shaped plate 8a, as seen in a side view, at both ends thereof in the longitudinal direction of the vehicle so that the flanges 8b bent at both ends face each other. Thus, the hinge female part 8 is formed in U-shape, as seen in a schematic section view (see FIG. 1). The hinge male part 4a is supported rotatably on the axis by inserting the pin 10 through the pin holes 11 provided on the flange parts 8b. The hinge female part 8 is fixed as hung on the top surface of the staged part 7a of the floor panel 7 used as the support structure, with the top portion 8$a_1$ provided in the plate 8a of the hinge female 8 in order to enable it to hang on the top surface of the staged part 7a. On the other hand, the front surface portion 8$a_2$ of the plate 8a of the hinge female part 8 is matched with and secured to the front end surface of the staged part 7a by means of a bolt, not shown.

Figure 5:
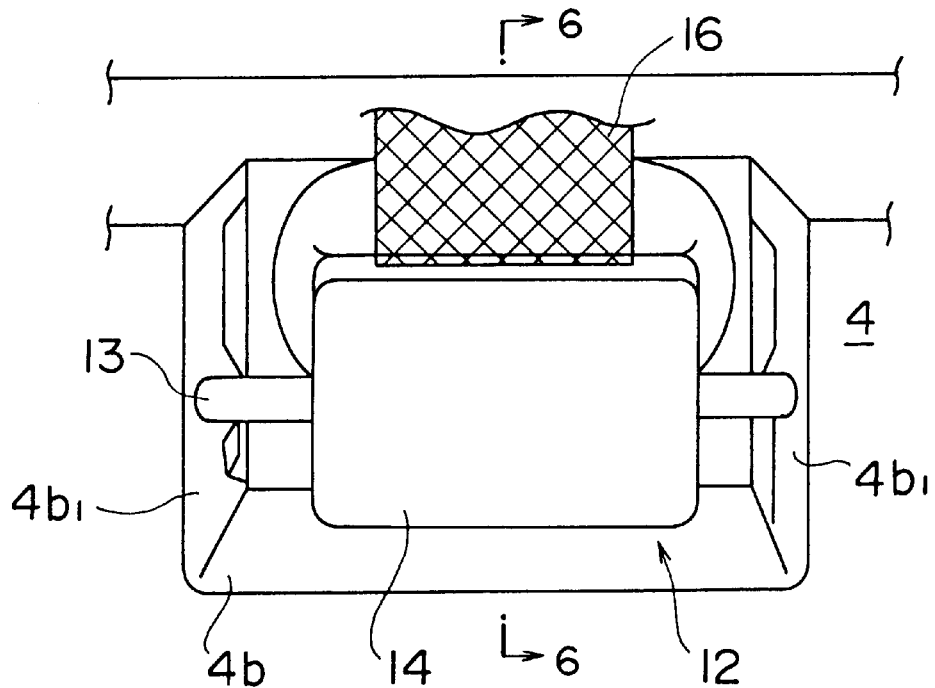
FIG. 5 is a front view showing the locking means of FIG. 1.
Figure 6:
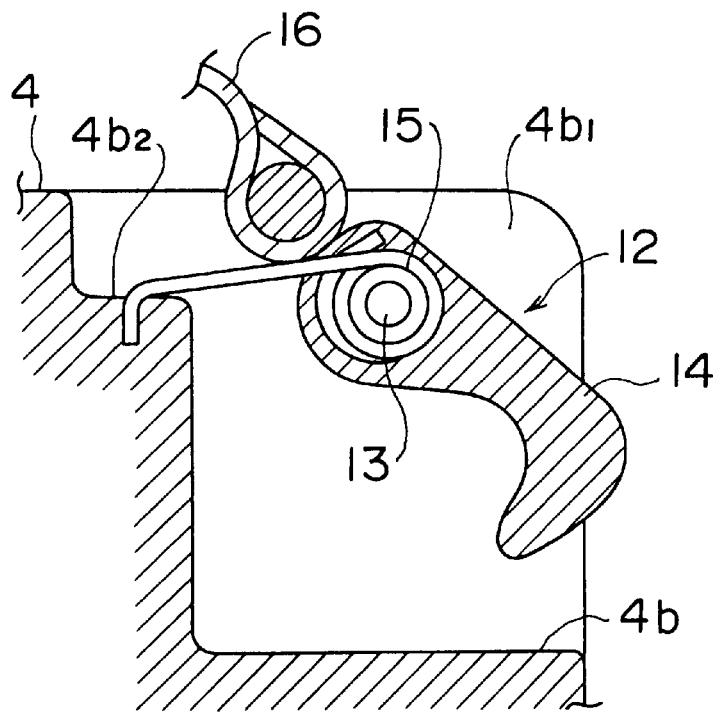
FIG. 6 is a section view taken along the line B—B of FIG. 5.

Meanwhile, the recess 4b for mounting the locking means is integrally formed into the cushion panel on its bottom surface at a rear end corner, as shown in FIG. 1, and the locking means 12 is mounted in the said recess 4b for securing the said seat cushion to the staged part 7a of the floor panel 7. locking means 12 comprises the L-shaped locking body 14 supported rotatably on the axis by the right and left inner wall surfaces 4$b_1$ of the recess 4b by way of the pin 13, the coil spring 15 mounted on the said pin 13 to allow the locking body 14 to return to a predetermined position, and the band 16 which pulls the locking body 14 against the force given by the coil spring 15, as shown in FIGS. 5 end 6. The coil spring 15 is fastened at one end thereof to the step portion 4$b_2$ formed in the recess 4b, and is attached at the other end to the locking body 14 so as to hold the locking body 14 in the predetermined position.

When the seat cushion 2 is brought down towards the staged part 7a of the floor panel 7, the locking means 12 is allowed to lock with the locking body 14 engaged with a striker (not shown) or the like disposed on the support side such as the staged part 7a. When the seat cushion 2 is to be erected in the forward direction of the vehicle, pulling the band 16 allows the locking body 14 to rotate against the spring force given by the coil spring 15, and thus to be disengaged from the striker.

Figure 7:
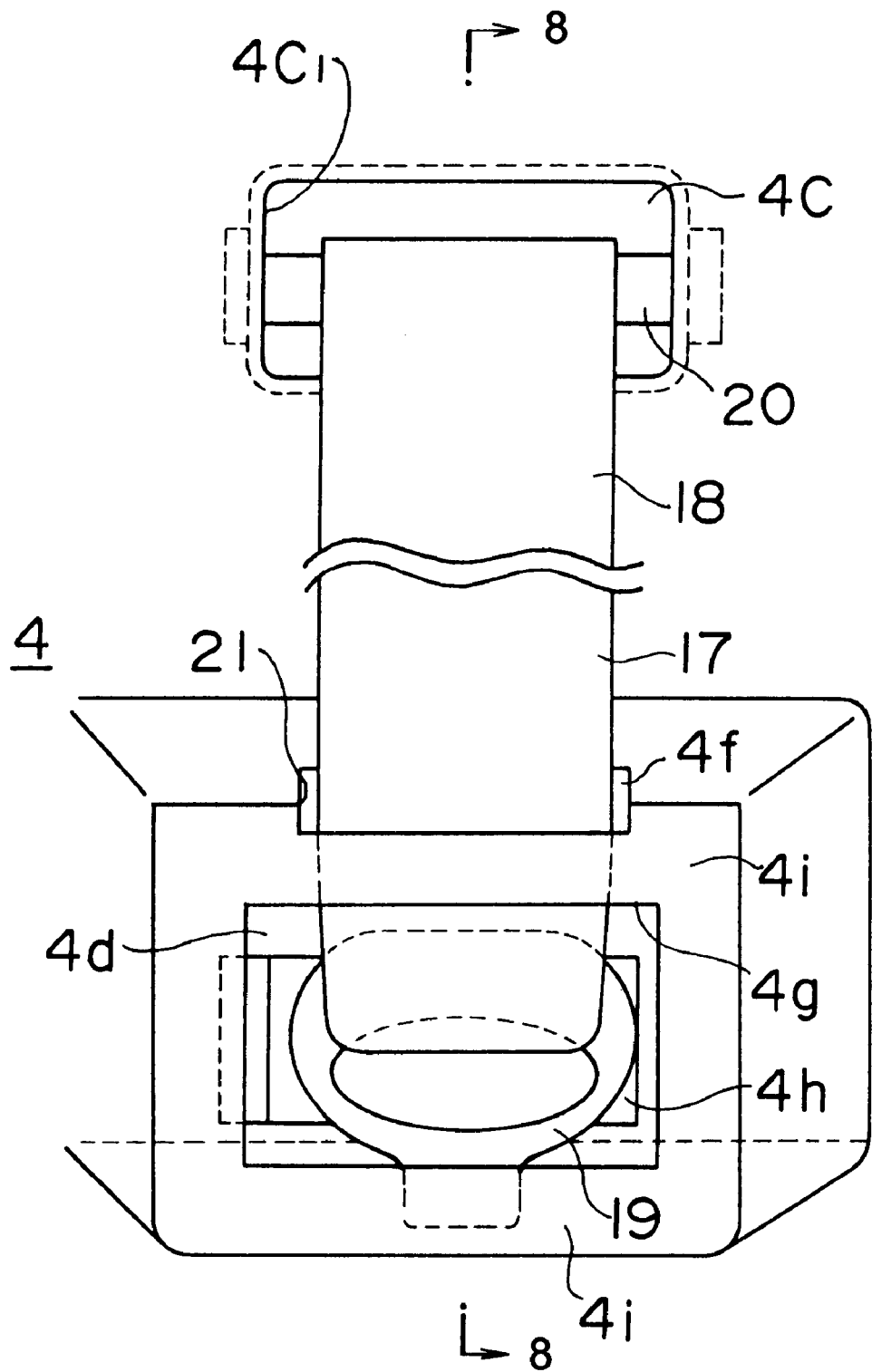
FIG. 7 is a front view showing the hook with belt of FIG. 1.
Figure 8:
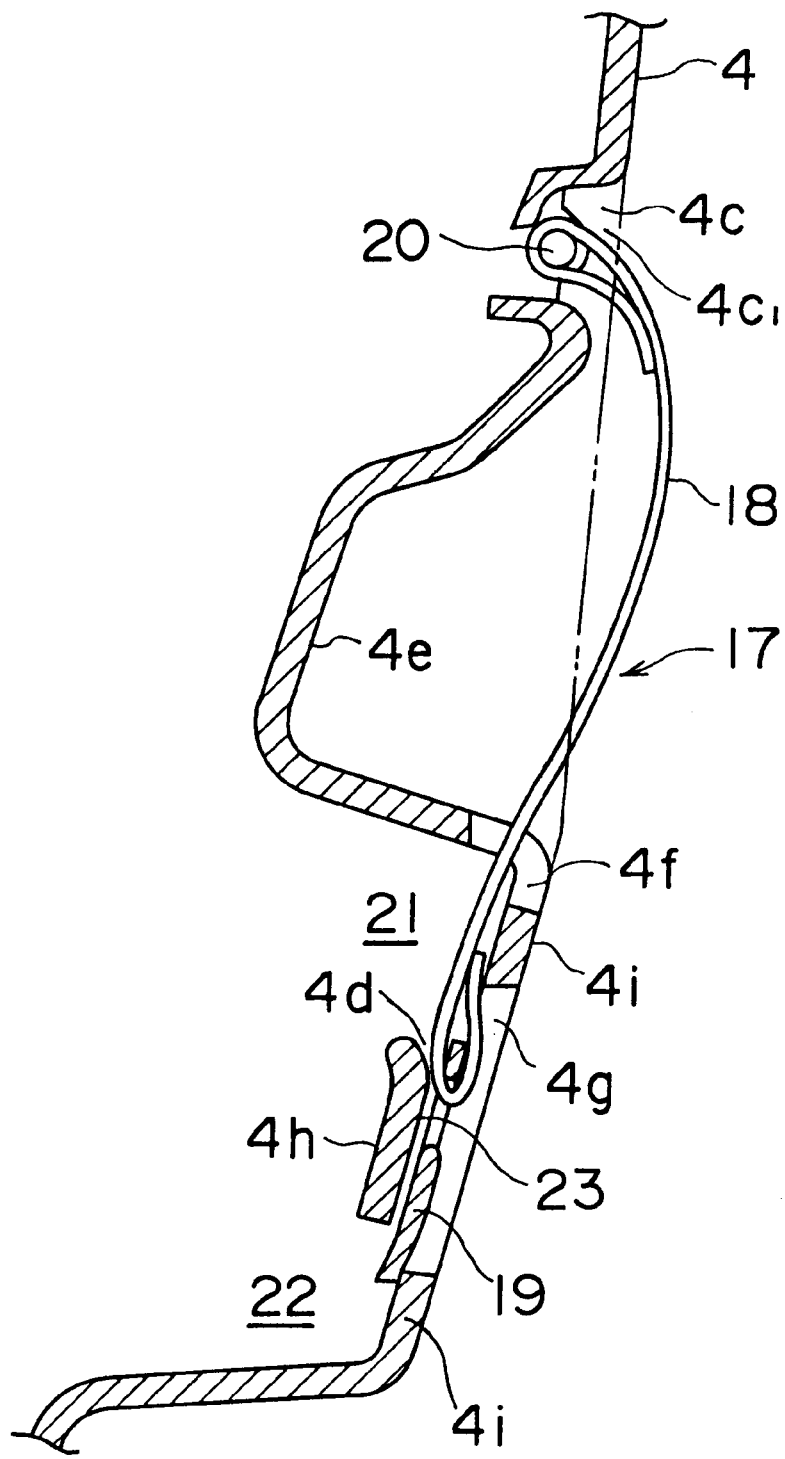
FIG. 8 is a section view taken along the line C—C of FIG. 7.
Figure 9:
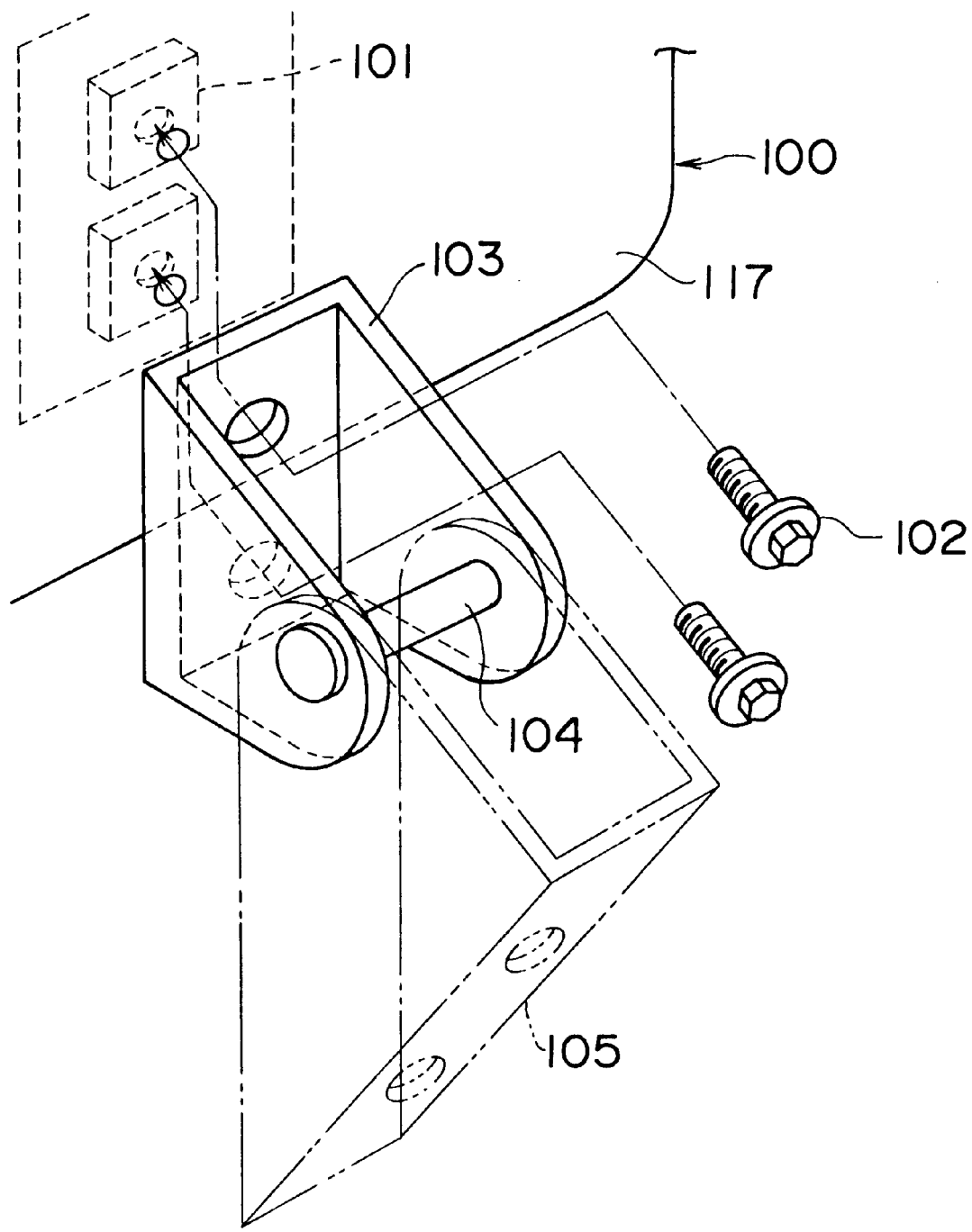
FIG. 9 is a perspective view showing the hinge mechanism of the double folding type of rear seat according to the prior art.
Figure 10:
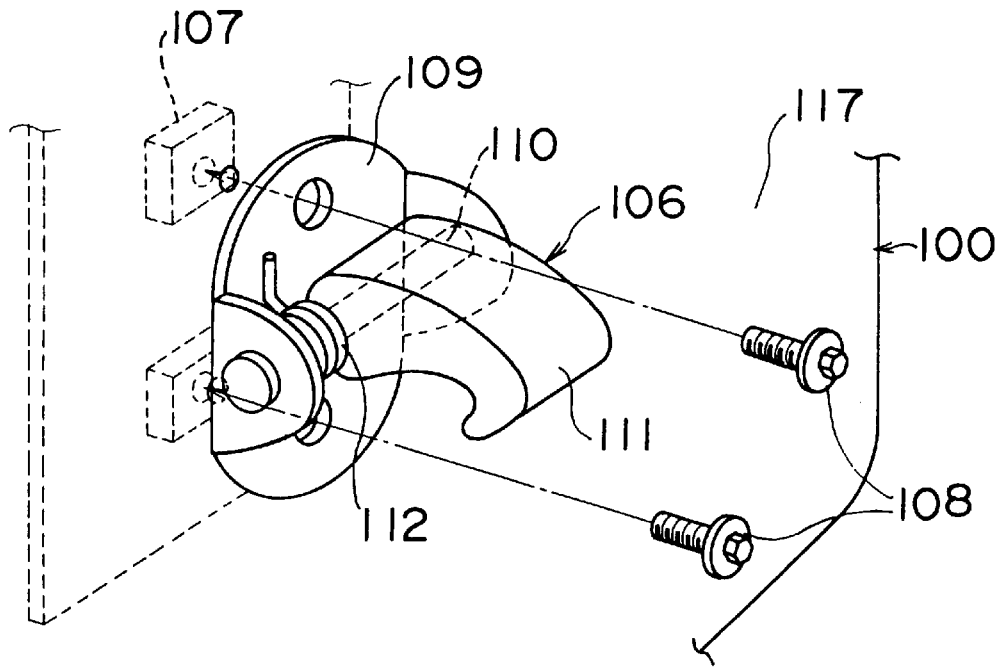
FIG. 10 is a perspective view showing the locking means of the double folding type of rear seat according to the prior art.
Figure 11:
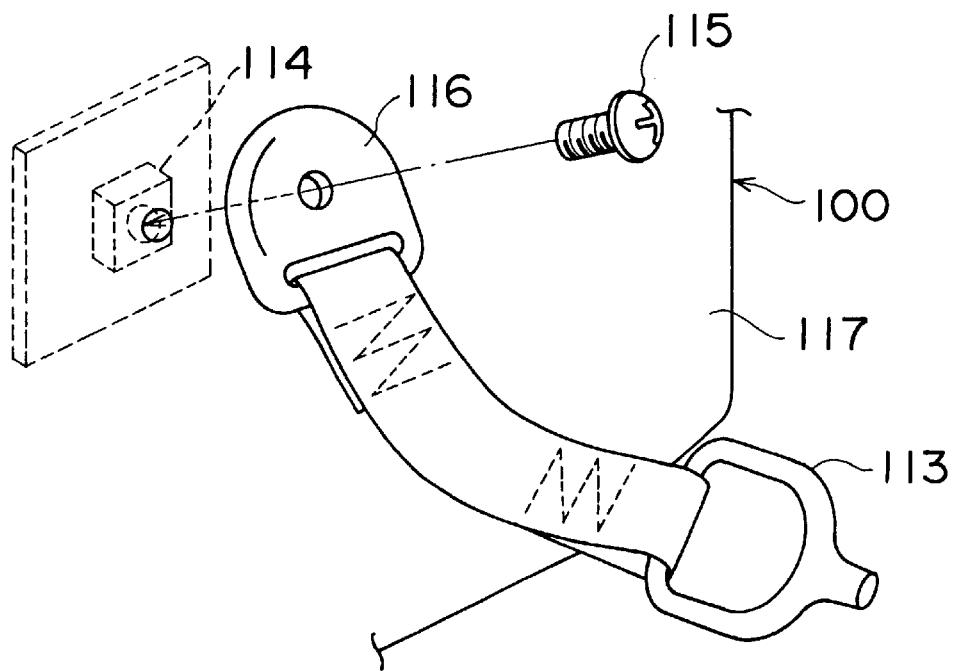
FIG. 11 is a perspective view showing the hook with belt of the double folding type of rear seat according to the prior art.

Referring to FIGS. 7 and 8, there is shown the recess part 4c for supporting the hook assembly 17 having a belt 18 attached, as well as the housing 4d for accommodating the hook assembly 17 when not in use, both of which are integrally formed in the central portion of the aforementioned cushion panel 4.

The hook assembly 17 has a hook 19 attached at one end of the belt 18, while the other end of the belt 18 is supported by means of the pin 20 attached to the inner side surfaces $4c_1$.

The housing 4d has a pocket portion 21 formed in the cushion panel 4 at a position corresponding to the one where the hook 19 hangs down, in order to receive the hook assembly 17 therein, when the cushion panel 4 is erected. The pocket portion 21 comprises an insertion opening 4f provided in the corner of the recess 4e formed on the bottom surface of the cushion panel 4, and a housing space 22 formed at the back of the cushion panel 4. On the surface of the cushion panel 4 at the portion corresponding to that housing space, a U-shaped cut-out 4g is formed, whereas the inner portion 4h of that cut-out is retracted inward with respect to the outer surface 4i of the cushion panel 4, in order to provide a gap 23 between the inner portion 4h and the outer surface 4i, by which the hook 19 is accommodated in the housing 4d so as to avoid rattling.

When the seat cushion 2 is turned forward to its erected position, and the seat back 3 is folded down forward, the hook assembly 19 is engaged with the holder 24 mounted on the rear surface of the seat back 3 so as to keep the seat cushion 2 and the seat back 3 stationary.

As described in the above, in the present invention, the cushion panel 4 is molded in a synthetic resin material. At the same time, additional parts such as, for example, the hinge male part 4a, recess 4b for mounting the locking means, recess 4c for supporting the belt with hook assembly 17, housing part 4d, etc., are integrally formed into the cushion panel 4. As a result, the number of parts of can be decreased, and the weight can be reduced.

Because the hinge male part 4a is formed integrally into the cushion panel 4, it is no longer necessary to use the bolts and weld nuts which must have been used in the prior art.

In addition, because the recess 4b for mounting the locking means is formed integrally into the cushion panel 4, the locking body 14 can directly be secured by means of the pin 13, and accordingly, it is no longer necessary to use the base, bolts, and/or weld nuts, which have been used previously.

Moreover, the recess 4c for supporting the hook assembly 17 having a belt attached is formed integrally into the cushion panel 4, so that the hook assembly 17 can be directly supported by means of the pin 20, and accordingly, there is no need any more to use the resin plate, screws, and/or weld nuts, which have been used traditionally. Furthermore, the hook assembly 19 can be accommodated in the housing, which prevents the hook assembly 19 from rattling.

Many modifications and other embodiments of the invention will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. While the particular embodiment of the invention has been described above with reference to the cushion panel 4 for use with the seat cushion 2, the invention may also be applied to the seat back panel to be mounted inside the seat back 3 internally mounted with additional parts such as a holder for a seat belt, etc., and it is needless to say that any other modifications and variations may be made, as appropriate, unless the essence of the invention is altered.

What is claimed is:

1. A vehicle seat comprising a seat cushion and a seat back, of double folding type in which the seat can be stored by pivoting of the seat cushion from a horizontal position to an erect position and by pivoting of said seat back from an erect position to a folded down position rearwardly of the erect seat cushion comprising:

a support structure, said seat cushion being rotatably connected to said support structure so that the seat cushion may be pivoted into said erected position, said seat back being pivotable into said lowered position when the seat cushion is in the erected position such that the seat back is adjacent a bottom surface of the seat cushion, and a hook having a belt attached thereto secured to the seat cushion for fixing the seat cushion by engaging the hook with a holder formed on the seat back, wherein a bottom surface of the seat cushion comprises a cushion panel molded from a synthetic resin material, and a recess for supporting the hook and a housing for accommodating the hook in a stored position are formed on a bottom surface of the cushion panel.

2. The vehicle seat of claim 1, wherein the housing for accommodating the hook comprises a pair of walls integrally formed with the cushion panel, the walls being spaced apart to define a hook-receiving space therebetween for housing the hook in a stored position.

3. The vehicle seat of claim 2, wherein at least one of the walls is recessed into the cushion panel.

4. A vehicle seat comprising a seat cushion and a seat back, of double folding type in which the seat can be stored when not in use by pivoting of the seat cushion from a horizontal position to an erect position and by pivoting of said seat back from an erect position to a folded down position rearwardly of the erect seat cushion comprising;

a reinforcement panel attached to at least one support structure secured to a vehicle body the reinforcement panel being molded from a synthetic resin material, and being attached to the support structure by a portion of the reinforcement panel which is formed integrally with the reinforcement panel, wherein the reinforcement panel defines a bottom surface of the seat cushion, wherein the seat cushion is pivotable into an erected position and the seat back is pivotable into a lowered position when the seat cushion is erected, and wherein the securement member comprises a hook assembly attached to the reinforcement panel of the seat cushion, the hook assembly including a hook and a flexible strap portion having one end secured to the reinforcement panel and an opposite free end attached to the hook, the hook being engageable with the seat back when the seat cushion is erected and the seat back is lowered so as to secure the seat back in the lowered position, said portion for attaching the hook assembly comprising a recess integrally formed in the reinforcement panel.

5. A vehicle seat comprising a seat cushion and a seat back, of double folding type in which the seat can be stored when not in use by pivoting of the seat cushion from a horizontal position to an erect position and by pivoting of said seat back from an erect position to a folded down position rearwardly of the erect seat cushion comprising:

a support structure secured to a vehicle body, said seat back being rotatably connected to said support structure for movement between said erect position and said folded down position, a pair of hinges rotatably connecting said seat cushion to said support structure for movement between said horizontal position and said erect position, a locking member attached to said reinforcement panel and being adapted to releasably engage the seat cushion with the support structure when said seat cushion is in the horizontal position, wherein a bottom surface of said seat cushion comprises a reinforcement panel, said reinforcement panel being molded from a synthetic resin material; and each of said hinges comprises a first hinge part comprising a pair of tongue pieces formed of said synthetic resin material and integrally molded with the reinforcement panel such that the tongue pieces project outwardly from said reinforcement panel and are spaced apart in the direction of vehicle width, each of said hinges further comprising a second hinge part connected to said support structure and being rotatably connected to said first hinge part.

6. The vehicle seat of claim 5, wherein said portion for attaching the locking member comprises a recess molded into the reinforcement panel, one end of the locking member being secured within the recess.

7. The vehicle seat of claim 6, wherein the locking member is secured in the recess by a pivot pin such that the locking member is pivotable about one end thereof, and further comprising a torsion spring attached between the reinforcement panel and the locking member for pivotably biasing the locking member in one direction.

8. The vehicle seat of claim 7, further comprising a band attached to the locking member such that pulling on the band causes the locking member to pivot in an opposite direction against the force of the spring.

9. A vehicle seat comprising a seat cushion and a seat back, of double folding type in which the seat cushion and the seat back can be stored by pivoting of said seat cushion into an erect position and pivoting of said seat back from an erect position into a folded down position rearwardly of the erect seat cushion comprising:

a support structure secured to a vehicle body, said seat back being rotatably connected to said support structure for movement between said erect position and said folded down position;

wherein a bottom surface of said seat cushion comprises a cushion panel, said cushion panel comprising an integrally molded recess housing a locking member adapted to engage said support structure when said seat cushion is in said horizontal position;

a hinge rotatably connecting said seat cushion to said support structure for pivoting between said vertical position and said erect position, said hinge comprising a first hinge part integrally molded with a forward-end portion of the cushion panel, and a second hinge part attached to said support structure and being rotatably connected to said first hinge part;

wherein said cushion panel is molded from a synthetic resin material and wherein said first hinge part integrally molded with said cushion panel comprises a pair of tongue pieces outwardly projecting from said cushion panel and being spaced apart in the direction of vehicle width.

* * * * *